United States Patent [19]

Chaborski et al.

[11] Patent Number: 4,521,107
[45] Date of Patent: Jun. 4, 1985

[54] APPARATUS FOR MEASURING DISTANCES BY MEASURING TIME OF TRAVEL OF A MEASURING LIGHT PULSE

[75] Inventors: Hoiko Chaborski, Munich; Walter Mehnert, Ottobrunn, both of Fed. Rep. of Germany

[73] Assignee: MITEC Moderne Industrietechnik GmbH, Ottobrunn, Fed. Rep. of Germany

[21] Appl. No.: 654,807

[22] Filed: Sep. 26, 1984

Related U.S. Application Data

[63] Continuation of Ser. No. 339,785, Jan. 15, 1982, abandoned.

[30] Foreign Application Priority Data

Feb. 3, 1981 [DE] Fed. Rep. of Germany ....... 3103567

[51] Int. Cl.³ .................. G01C 3/08; G01S 13/10
[52] U.S. Cl. .................. 356/5; 343/13 R; 367/97
[58] Field of Search ............. 356/5; 343/13, 7.3; 367/95, 97

[56] References Cited

U.S. PATENT DOCUMENTS

| | | | |
|---|---|---|---|
| 3,390,348 | 6/1968 | Granqvist | 343/13 R |
| 3,539,978 | 11/1970 | Stedtnitz | 367/97 |
| 3,680,964 | 8/1972 | Granqvist | 356/141 |
| 3,740,141 | 6/1973 | DeWitt, Jr. | 356/5 |
| 3,752,582 | 8/1973 | Troll et al. | 356/5 |
| 3,779,645 | 12/1973 | Nakazawa et al. | 356/5 |
| 3,898,007 | 8/1975 | Wiklund | 356/4 |
| 3,992,615 | 11/1976 | Bennett et al. | 356/5 |
| 4,113,381 | 9/1978 | Epstein | 356/5 |
| 4,181,431 | 1/1980 | Chaborski | 356/5 |

Primary Examiner—S. C. Buczinski

[57] ABSTRACT

An apparatus measures the distance of a target by measuring the time of travel of a light pulse from the measuring apparatus to the target and back wherein it is important to achieve high accuracy in timing to correlate, for a distant target, the time of transmission with the start of measuring the time of travel and the time of receiving a reflected light pulse and the end of the time measurement. For a near target, the start of distance measurement is correlated with receipt of a reflected measuring light pulse and a stop signal is correlated with a delayed reference light pulse. For this purpose a reference light pulse is branched off from a measuring light pulse and passed by light guides to a single receiver unit. The reference light pulse is passed to the receiver unit either through a short or a long light path depending on whether the target is distant or near, respectively. Attenuators are provided in each path to insure that the start and end of a time measurement of target distance can be performed without interfering signals.

29 Claims, 6 Drawing Figures

APPARATUS FOR MEASURING DISTANCES BY MEASURING TIME OF TRAVEL OF A MEASURING LIGHT PULSE

REFERENCE TO PRIOR APPLICATION

This application is a continuation of our earlier application, Ser. No. 339,785 filed Jan. 15, 1982, now abandoned.

FIELD OF THE INVENTION

The present invention relates to distance measuring apparatus for measuring distances as a function of the time of travel of a measuring light pulse from a transmitter in the apparatus to a target and from the target to a receiver in the apparatus.

BACKGROUND ART

Distance measuring apparatus are known which measure distance as a function of time of travel of a measurement light pulse and operate in different ways. All of these apparatuses produce a start signal, related to the time of transmission of the measuring light pulse, for initiating transit time measurement. In some case, the electric signal which triggers the transmitter which generates the light pulse is used to initiate a start signal for a time measuring unit of the apparatus. A problem arises where the light pulse transmitter is a laser diode because it reacts to its trigger pulse with a delay which is not constant.

Additionally, when laser diodes are triggered by high amplitude current pulses for producing the electromagnetic measuring light pulses interference signals are produced which if occurring when the start signal is also produced will shift in time the start signal. The extent of this shift changes in an unpredictable manner. This adversely affects the accuracy of the measurement as a too early or belated start of the time measurement causes the measured time of travel to be greater or less than the actual time of travel so that larger or smaller distance values are obtained. The delays by the transmitter in reacting to its trigger pulse must also be taken into account.

In dealing with the foregoing problem one approach has been to split a part of the generated light pulse and to supply that part as a reference light pulse along a short reference light path within the apparatus to an auxiliary receiver therein having a receiving channel of the same design as the main receiving channel which receives and processes reflected measuring light pulse from the target. The output signal generated by the auxiliary receiver upon reception of the reference light pulse is used to produce a start signal for starting the transit time measurement, whereas the main receiving channel produces in reaction to receipt of a reflected measuring pulse a stop signal for stopping the transit time measurement.

The use of two separate receivers with their separate receiving channels, because of their inherent different signal delays arising from, for example, delays in response time of circuit components in the receiver, reduce the accuracy of the distance measuring results. Also use of two receiver systems increases complexity of the apparatus because fluctuations in response must be minimized as well as the differences in signal delays in the receiver.

Because it is impossible to eliminate differences in the time delays occurring when using two receiving channels with different delays (also drift and operational fluctuation) it is necessary after each transit time measurement to determine a correction factor by measuring the difference of the two time delays in the two receiving channels as part of a calibration operation and to correct the transit time measured value by means of the correction factor. This undesirably increases the complexity of the apparatus.

SUMMARY OF THE INVENTION

With the foregoing in mind, it is an object of the present invention to provide an apparatus for measuring both short and long distances by measuring the time of travel of a measuring light pulse through use of short and long reference light paths and a single receiver which is adapted to generate (a) for a distant target, a start signal related to the transmission of a measuring light pulse and a stop signal on receipt of a reflected measuring light pulse, and (b) for a near, short distance target, a start signal on receipt of a reflected measuring light pulse and a stop signal on receipt of a delayed reference light pulse.

With the apparatus of the invention it is possible to measure distances to within $\pm 1$ cm for distance measurements of between 0 cm and 10 km and more.

The measuring apparatus of the invention enables determination of the precise time of transmitting a measuring light pulse by means of a reference light pulse, simultaneously produced with the measuring light pulse. Although the reference light pulse is delayed in its transit to the receiver, this is of little consequence since this optical delay is known and is in any event so small that any deviations or fluctuations that may be experienced are insignificant even where high measuring accuracy is required. Significantly, the reference light pulse is supplied to one and the same receiver as the reflected measurement light pulse and is instrumental in providing a time-related distance measuring signal as is also the reflected measuring light pulse, as hereinafter more fully described. Additionally, for the short periods of time the reference light pulse and the measuring light pulse sequentially arrive at the receiver, even assuming measuring large distances, the electrical delays intrinsic in the receiver undergo no change in value. Consequently, not only the start but also the end of every transit time measurement is necessarily delayed for the same time; therefore these delays do not influence the measuring result.

Medium and long term fluctuations and drift in respect of the time delay in the receiving channel also have no effect on a measuring result obtained within a very short period of time. For this reason, stabilizing circuits for the receiver are not required.

It is known that every receiving channel has a certain "inoperative" or recovery time. Thus, it is important that the light pulses arrive at the receiver when the receiving channel is operative. There is a finite time for receiving channel recovery from its "turnoff" state, that time defining a critical measuring distance which, if not dealt with, would establish a lower limit for distance measurement. For example, assuming a "turnoff" time of 1 microsecond, a distance shorter than about 150 meters could not be measured since, because of the high velocity of light, the reflected measuring light pulse would arrive at the receiver in so short a time after the reference light pulse, that the receiving channel would not be able to produce a time-related distance measuring signal; i.e. a stop signal for the time distance measurement being started by the time-related distance measuring signal produced upon reception of the reference light pulse.

For a measurement apparatus with a single receiving channel not to be limited to a lower limit for measuring distance, the reference light pulse is supplied in accordance with the invention to the receiver either by way of a short reference light path branch or by way of a long reference light path branch. According to the invention, the delay in the long reference light path branch is greater than twice the "turnoff" time of the receiving channel.

For distances greater than the mentioned critical distance, the reference light pulse is supplied to the receiver by means of a short reference light path branch, so that it arrives at the receiver first; i.e. before the reflected measuring light pulse. In this case the reference light pulse is used to produce the first time-related distance measuring signal; i.e. the start signal, the reflected measuring light pulse arriving subsequently and producing the second time-related distance measuring signal; i.e. the stop signal for transit time measurement.

For distances shorter than the mentioned critical distance the reference light pulse is supplied to the receiver by means of a long reference light path branch. This causes the order in which the measuring light pulse and the reference light pulse arrive at the receiver to be the inverse order of the "normal" measuring operation for distant targets. Because the reference light pulse, arrives at the receiver after the arrival of the reflected measuring light pulse and with sufficient delay to ensure that the receiver is beyond its "turnoff" time, the reference light pulse may be processed without difficulty.

The advantages of delaying the reference light pulse instead of the measuring light pulse is that the attenuation, related to such delay, will not decrease the sensitivity of the measuring apparatus as would be the case were the measuring light pulse to be delayed. The reference light pulse may, at any time, be made strong enough to give a high enough intensity at the receiver.

It will be clear that with the long reference light path branch turned on and with a delay time of $2\tau+\delta$ (wherein $\tau$ is the turnoff or recovery time of the receiving channel and $\delta$ is a small amount by which the delay caused by the long reference light path branch is greater than $2\tau$) the measured difference in time $\Delta t$ between the time-related distance measuring signal of the measuring light pulse; i.e. the start signal for the transit time measurement, and the time-related distance measuring signal of the reference light pulse; i.e. the stop signal of the transit time measurement, will no longer be directly equal to the transit time $\Delta T$ looked for. This transit time, however, may be worked out from the measured time difference using the equation $$\Delta T = 2\tau + \delta - \Delta t.$$

Dependent on if the reference light pulse is supplied to the receiver by means of the long or by means of the short reference light path branch it may be seen that the transit time is worked out somewhat differently, this, however, not being any trouble.

Even if the reference light pulse is supplied directly to the receiver by means of the short reference light path branch, it is delayed somewhat so that the reference light pulse arrives at the receiver at a time at which interference signals being caused by the generation of the light pulse have generally decayed fully.

In the case of a more specially preferred form of the apparatus of the invention the switching over from one to the other reference light path branch is caused automatically by the apparatus itself. For this purpose the apparatus firstly attempts to obtain a measurement value by using the short reference light path branch. If this does not result in the proper generation of a stop signal a further attempt is made by using now the long reference light path branch.

In order to provide for the exact correlation in time between the point in time of receiving the light pulse and the respective time-related distance measuring signal, which exact correlation is necessary to obtain a measuring accuracy of better than $\pm 1$ cm, one of the very exactly determinable zero transitions of a damped oscillation is used for generating said time-related distance measuring signal. This damped oscillation is excited upon reception of the respective light pulse in a resonance system being comprised in said receiving channel and being joined with the output of the receiver. Although the amplitudes of the half-waves of such an oscillation are dependent on the strength of the exciting effect, that is to say on the brightness of the light pulse in question, the cycle length of this oscillation is, however, in the short run, very highly constant. Therefore, it may be taken for certain that the difference in time between, for example, the fourth zero transition of the oscillation, excited on receiving the reference light pulse, and the point in time of receiving this reference light pulse will be truly equal to the corresponding difference for the measuring light pulse. As a consequence, it is possible, without any noticeable errors in the measuring operation, to measure the difference in time between said two corresponding zero transistions, or any other electrical signals exactly correlated in time thereto, rather than to measure the difference between the points in time of receiving the corresponding light pulses.

Detecting the zero transitions may best be undertaken by the comparison between the output signal of the resonance system (or of the amplifier joined up with its output) with the zero level. However, such zero level is representative of the resting condition of the resonance system before it has been excited. For this reason the comparison is enabled only after triggering of the resonance system, because otherwise even low-level interferences having an effect on the zero lebel would permanently cause signals stopping and starting the transit time measurement.

The detecting of the triggering of the resonance system may be undertaken by making a comparison between its output signal, or the output signal of its output amplifier, with two different reference levels, of different value and each different to the zero level, comparison with the zero level only being enabled when the signal is higher than or, in the other case, again lower than these two reference levels in a defined order. In this way, it is possible to make certain that, specially in the case of very low level light pulses, responsible for only low oscillation amplitudes, there is no untimely enabling of the zero level comparison and, for this reason, no wrong measuring result is produced for the distance measured.

For producing a time-related distance measuring signal it is advantageous to use a zero transition of an excited oscillation, which, on the one hand, is as far as possible from the point of time of exciting to make certain that all interfering effects related to the transmission and receiving of the light pulse in question will have decayed so that the zero transition may be detected in the desired way, and on the other hand, is as far as possible from the decaying end of the oscillation event. This makes certain that the zero transition takes place as steeply as possible and, for this reason, any interference likely to have an effect on the oscillation event, is only responsible for low-level changes in the timing of this zero transition. It has in fact turned out that it is possible to keep to the these two oppositely directed conditions by using the fourth zero transition of an excited oscillation for producing a time-related distance measuring signal.

For producing a true correlation in time between the point in time of receiving a light pulse and the time-related distance measuring signal produced by a given zero transition of the excited oscillation, it is not only necessary for overly small oscillation signals to be suppressed (and not used for transit time measuring) with the help of the two reference levels as noted. If in fact the resonance system is excited by a very strong light pulse to such a strong oscillation that the amplifier joined with the system's output is over-loaded or saturated to be out of its linear range, the timing of the zero transitions of the amplifier output signal may be greatly changed so as to make correct transit time measuring operations impossible.

For this reason, a top limit for the output signal of the amplifier joined with the output of the oscillation system is monitored by using a third reference level. If a signal is greater than this third reference level, the light pulse in question is not used for measuring. In place of it, a new pulse is transmitted and, at the same time, care is taken to see that less strong excitation of the resonance system takes place. That is to say, the strength of the measuring light pulse coming to the receiver is decreased or the sensitivity of the receiver is reduced. The first step may be undertaken by changing the trnsmitter power or putting one or more attenuation units in the path of the measuring light pulse, the last-named step being effected for example when the receiver is a photodiode, by changing the biasing voltage of the photodiode.

In any case, there are a number of different parameters which make it possible, on making a new measurement attempt to attenuate the signal to be processed by the amplifier on the output side of the resonance system.

In any such first attempt at measuring which goes wrong because of saturation of the amplifier, it is only seen that there had been such saturation, but without getting any figure for the degree thereof. Therefore, it is unknown what attenuation factor will be necessary to get into the linear range of the amplifier.

In the apparatus of the invention it is possible to get to this "right" attenuation value step-by-step and to this end use is best made of a base-attenuation which is smaller than the ratio between the greatest and smallest signals to be processed by the amplifier. If then, on any further saturation of the amplifier, the attenuation of the amplifier output signal is increased stepwise (by changing the parameters necessary for this) with integral value powers of this base-attenuation value, it is possible to be certain that a further attenuation step does not cause an overly low input signal, which also could not be processed.

For this reason, a distance measuring or ranging system of the present invention starting with a signal saturating the amplifier may go on measuring by transmitting new light pulses and, at the same time, stepwise increasing the attenuation of the amplifier input signal till the amplifier is back in its linear range.

For causing the optical attenuation of the measuring light pulse, an optical attenuation unit may be provided in the light path between the receiving optical system and the receiver, the attenuation value of said attenuation unit being controllable.

Further features, objects and advantages of the invention will be apparent from the following disclosure taken in conjunction with the accompanying drawings.

DESCRIPTION OF PREFERRED EMBODIMENTS

Figure 1:
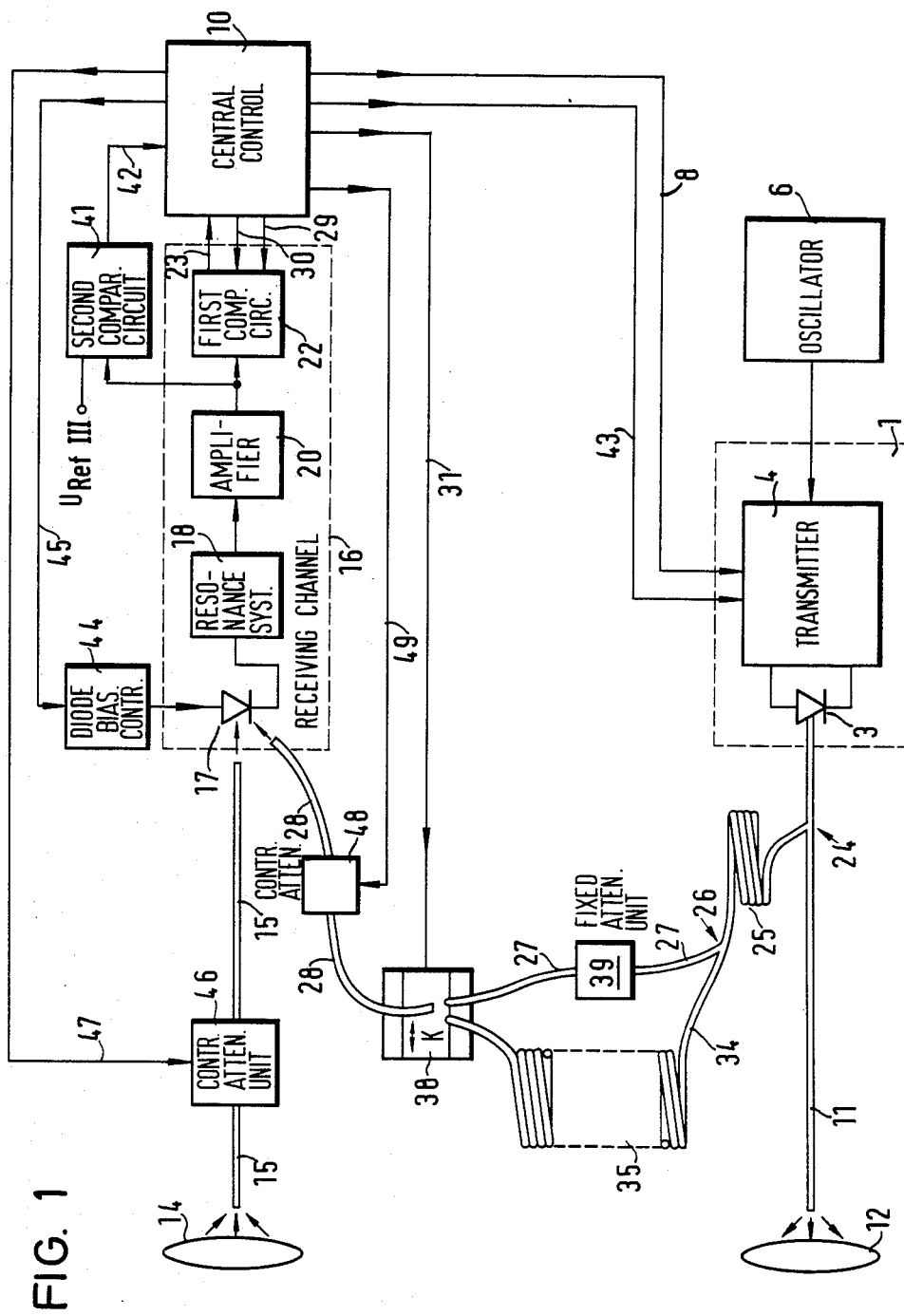
FIG. 1 is a block and partial schematic diagram of a distance measuring apparatus in accordance with the invention.

As seen from FIG. 1, the distance measuring apparatus of the invention utilizes a transmitter 1 comprising, for example, a laser transmitter diode 3 and a drive or control circuit 4 for the transmitting diode 3 and which is generally constituted of a "slowly" charged energy storage device such, for example, as a capacitor, and an electronic switch for discharging the capacitor quickly through the transmitting diode 3 for producing a laser light pulse.

For periodic operation, the switch in circuit 4 may be controlled by an oscillator 6 at a given frequency, or in place of this or in addition thereto, the switch in circuit 4 can be triggered for producing single pulses, by means of a control connecting line 8 from a central control unit 10. The trigger signal supplied by line 8 is timed in relation to the signals produced by a multivibrator voltage generator so that both reference light pulses and reflected measurement light pulses can be received by the receiver in the absence of interference noise signals respectively produced during operation of the multivibrator voltage generator.

A part of each light pulse generated by the transmitting diode 3 is fed as a measuring light pulse by light guide 11 to a transmitting optical system 12 to a target which is to be ranged. In FIG. 1, the transmitting optical system 12 is schematically exemplified as a single lens.

Another part of each light pulse generated by the transmitting diode 3 serves as a reference light pulse and is branched off at branching point 24 and directed into a reference light path, which includes guide coil 25, and thence to a further branching point 26, splitting the reference light path into two functionally parallel reference light path branches 27 and 34 of different lengths, which branches merge at an optical two-way switch 38 into a single light guide 28 leading to a photodiode 17 comprising the electro-optical receiver of receiving channel 16. Arrow K depicts the switching motion of switch 38, light path 27 being connected by switch 38 to light path 28 in the switch position shown in FIG. 1.

As noted, at the branching point 26, the reference light path is split into two parts, one path constituting a short reference light path branch 27 and the other a long reference light path branch 34. As a function of the position of the optical two-way switch 38, which is operated under control of a signal supplied by line 31 of the central control 10, only one of these functionally two parallel paths will pass the reference light pulse through light pulse guide 28 to the photodiode 17, the other path being effectively blocked.

For a long distance target, the light path switch 38 is positioned so that the short reference light path branch 27 is connected by light guide 28 to photodiode 17 so that the reference light pulse, branched off at 24 from a light pulse generated by transmitting diode 3, arrives at the photodiode 17 before the measuring light pulse reflected by the target arrives at the photodiode 17 by way of the receiving optical system 14, illustrated in FIG. 1 as a single lens, and fiber light guide 15. Each of the electrical signals produced by the photodiode 17 in response to these two light pulses; i.e. reference and reflected measurement light pulses is used for generating oscillations in a resonance system 18 supplied with the output of the photodiode 17, resonance system 18 being described, for example, in U.S. Pat. No. 4,139,301 granted on Feb. 13, 1979 to Hoiko Chaborski the disclosure of which with respect to such resonance system is incorporated by reference. While a parallel resonant oscillation circuit is described in U.S. Pat. No. 4,139,301 it is possible for purpose of this invention for the resonance system 18 to be a series resonant oscillation circuit or any other suitable electromagnetic oscillation system. The controlling criteria is that the resonance system 18 be excited by each of the signals produced by the photodiode 17 on receiving a relevant light pulse; i.e. first on receipt of the reference light pulse and then on receipt of the reflected measurement light pulse so that the resonance system produces for each light pulse received damped oscillations, generally sinusoidal, the amplitude of individual half-oscillations decreasing exponentially; see (a) of FIG. 4. If the distance of the target is large, the time distance between the two light pulses, namely the reference light pulse and the reflected measurement light pulse is also large and the first oscillation initiated on receipt of the reference light pulse by the photodiode 17 will have been completely damped by the time the measuring light pulse arrives at photodiode 17 to produce second oscillations.

The signals corresponding to the first and second oscillation events in the resonance system 18 are amplified by amplifier 20 (more specifically shown in FIG. 2) the output of which is supplied to a first comparison circuit 22 which produces a time-measurement signal. The first comparison circuit 22 is described in greater detail with reference to FIGS. 3 and 4.

Suffice it to say for the present that the main purpose of the first comparison circuit 22 is to produce a time-related measurement signal for each reception of a light pulse by the photodiode 17, the timing of this time related signal being such as to have a predetermined time relation relative to the center of the relevant light pulse; i.e. the reference and/or the reflected measurement light pulse.

The time-related distance measuring signal may be, for example, the falling or rising edge of an essentially rectangular voltage pulse. Accordingly, for the measuring and reference light pulses received, the one after the other by the photodiode 17, two time-related distance measuring signals are produced, one after the other. That one of the two time-related distance measuring signals first received starts the time of travel measurement for the measuring light pulse, whereas the light pulse subsequently received for a given measurement stops the time measurement. When the measuring light pulse is reflected by a distant target the related start measurement signal, initiated on reception by the photodiode 17 of the reference light pulse, is the first to be produced for the distance measurement. For such distant targets, the time related distance measuring signal initiated on receipt by the photodiode 17 of the reflected measuring light pulse is the second to be produced as the stop signal for a given distance measurement. In this case, both time-related distance measuring signals are supplied by way of line 23 to a time measuring unit which, because it does not form part of this invention, and for purposes of simplicity, has not been shown in the drawing but is to be understood to be part of the central control 10.

The reference light pulse may also be branched by use of a half-transparent mirror at branching point 24. In any event the transmitting optical system 12 and the reference light path get balanced light from the transmitting LED 3 notwithstanding the possible difference in time reaction of different surface parts of the transmitting LED 3 to the trigger pulse.

The light guide coil 25 in this reference light path is intended to delay a reference light pulse so that it does not arrive at the photodiode 17 before or during the interference effects experienced during generation by the transmitter of a light pulse. The delay is sufficiently long to ensure arrival of the reference light pulse at the photodiode after the effects of the mentioned interference have ceased to be operative.

Once the resonance system 18, by receipt of a light pulse is excited by the diode 17, a damped oscillation is generated. If a second light pulse is received by diode 17 thereafter before the first oscillation has been decayed, the newly excited oscillation would overlay the first one thereby preventing generation of a stop signal which is correctly related in time to the reception of the later received light pulse.

To prevent this, in accordance with the invention circuit 22 is blocked once it has reacted to the excitation of the resonance system 18 (which produced the start signal for distance measurement) such blocking taking place for at least a minimum time $\tau$ which must be longer than the recovery time of the receiving channel 16. Stated differently, the blocking time must be somewhat greater than the time that must elapse before the resonance system 18 may again be excited after its earlier excitation event which as stated is a function of the recovery time of receiving channel 16. At the earliest after this minimum time $\tau$ has elapsed, circuit 22 is reset by an enable signal from the central control 10 by way of line 29, whereby to free circuit 22 again to respond to the oscillation of the resonance system 18.

The following discussion relates to a measuring apparatus wherein the target distance is very small. In that case the measuring light pulse reflected by the target may arrive at the receiving diode 17 either before or at the same time as the reference light pulse or before the end of the recovery time $\tau$ of the receiving channel. In all these events the resonance system 18 is actuated on receipt of the first light pulse to arrive and, in response thereto, a start signal is generated by circuit 22, starting the time measurement of travel of the measurement light pulse. In the case under consideration, the second light pulse received by the receiving diode 17 arrives at a point in time at which the receiving channel 16 (due to delay in recovery) is not able to process the second signal, in particular because circuit 22 has not again been enabled since the enabling signal is provided in point of time slightly after the recovery time of the receiving channel 16. Accordingly, no second time-related measurement signal is produced so that there is no stopping the time of travel measuring operation which had initially been started. In consequence of the foregoing, the indicated time measurement continues without being stopped and quickly reaches and exceeds a predetermined maximum value which, based on the velocity of light, is related to the maximum distance that can be measured by the apparatus. The exceeding of the maximum measurement value is detected by the central control 10 and used to terminate the time of travel measurement and for giving further control instructions, detailed below.

One of these control instructions is provided by line 31 to optical two-way switch 38 and causes the switch to connect the long 34 rather than the short 27 reference light path branch with light guide 28 leading to the receiving diode 17. The delay or transit time established by this long reference light path branch 34 is at least two times the recovery time $\tau$ of the receiving channel 16 so that the overall delay that a reference light pulse undergoes, taking into consideration passage through light guides 25, 34, 35, 28, is greater than $2\tau$. For example, where the receiving channel recovery time $\tau$ is about 1.0 microseconds; then the long reference light path branch 34 has to be about 600 m long. For fitting such a length of light guide in the apparatus, it is advantageous to arrange the light guide in coil form such as coil 35. Light guides of very small diameter are available and it is possible to make the coil of a sufficiently small size to enable its incorporation in a compact measuring apparatus. While such light guides may have high loss characteristics, this is not significant for the reference light pulse, because the transmitting power is sufficiently strong to ensure operation of the resonance system 18.

In the parallel arrangement in the embodiment of FIG. 1 comprising a generally delay-free light path and a reference light path producing a desired delay, the reference light pulse, branched at the Y-branchpoint 24 from the transmitting light guide 11 goes, after making its way through the small delay coil 25, to a further Y-like branchpoint 26 where it is divided into two parts, one of which is forwarded along the short reference light path 27 and the other through the large delay coil 35. Dependent on the position of the optical two-way switch 38, the pulse in one of these branches passes by way of the light guide 28 to the photodiode 17 and is thus used as a reference light pulse for producing the time-related distance measuring signal. Two-way switch 38 is seen in FIG. 1 in a position in which the reference light pulse in the short reference light path is passed, arrow K making clear the switching direction of the movable part of the two-way switch. Further details of the design of switch 38 will be given later in the account of FIG. 5.

In a variation of the disclosed invention, in place of the optical two-way switch 38, a Y-like branching point like branching points 24 and 26 may be used for the two parallel reference light path branches. In this case, an attenuation device is placed in each of the parallel reference light path branches 27 and 34, the attenuation devices being controllable by an electrical signal from the central control 10, between a very low attenuation value (equal to nearly zero) and a very high attenuation value (nearly infinite). The attenuation devices are oppositely controlled by the electrical signal to provide the desired two-way switching function. The electrical signal is supplied from the control 10 by lines 31 which in this case switches the attenuators rather than switch 38 so that one of the attenuators is at its lowest attenuation value and the other is at its highest value. Attenuation devices which may be very quickly switched and may be used for purpose of the invention comprise, for example, double-refracting PLZT or PLMNZT ceramic wafers as disclosed, for example, in the Forschungsbericht (research report) K 300 4 issued by the Bundesministerium fur Forschung und Technologie (Federal Ministry for Research and Technology) dated August 1979.

For the reference light pulse to have substantially the same intensity at the receiving diode 17 independently of whether the reference light pulses travel along the short or long reference light path branch, an attenuation device 39 of fixed attenuation equal to the attenuation caused by the long reference light path branch 34 may be placed in the short reference light path branch 27.

If the central control 10 senses, with two-way switch 38 in a position to supply a reference light pulse in the short reference light path branch 27 to the photodiode 17, that although a transit time measurement has started and that it has not been stopped within a predetermined time, the central control 10 will interpret this to be due to a target a small distance from the measuring apparatus and, in consequence, takes steps to move the two-way switch 38 into the other position, in which other position the reference light pulse in the long reference light path branch 34, will be supplied to the photodiode 17. With this new position of switch 38, on production of the next light pulse under control of circuit 4 operated by the trigger signal supplied by lead 8 from the central control 10, the measuring light pulse on reflection from a short distance target will be sensed by the receiving photodiode which will therefore respond thereto before arrival of the reference light pulse which has been delayed in the long reference light path branch 34 so that the two light pulses are separately detected without any difficulty by the receiving channel 16 to provide the necessary start and stop signals. Although, the order of these signals is reversed because the measurement of the time of travel is started by the reflected measuring light pulse and stopped by the reference light, in contradistinction to the reverse order as previously described when measuring the distance of distant targets. In either case the measurement value obtained is correct as will be appreciated from the following.

The below time-illustrations have been simplified by assuming that the light pulses travel in zero time from beam splitter 24 to transmitter lens 12 and in zero time from receiver lens 14 to receiver diode 17. While this is not exactly true, the corresponding distances, which add to the actual distance of the target, can be taken into account by suitable calibration as will be appreciated from the following illustrations.

Assuming first a "normal" mode of operation, that is, for long distance targets the following time-illustration is applicable:

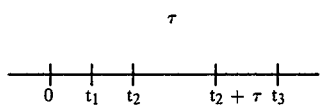

In this diagram

0 is the time at which the light pulse is emitted by the transmitter, $t_1$ is the time at which the light pulse arrives at the beam splitter and is divided into the measuring light pulse and the reference light pulse, and is also the time at which, according to the above illustration, the time of travel of the measuring light pulse to the target is considered to begin (actually it begins when the measuring light pulse passes the transmitter lens or at any other arbitrarily chosen "zero point"), $t_2$ is the time at which the reference light pulse in the short reference light path branch reaches the receiver which (with a very short delay not shown in the illustration) produces a start signal for the time measurement, $\tau$ is the recovery time of the receiver channel during which the receiver is unable to respond to and process any further light pulse, and $t_3$ is the time at which the measuring light pulse reflected from the target reaches the receiver which (with the same short delay as at $t_2$) produces a stop signal for terminating the time measurement. In the above illustration, $t_3$ is also the time at which, the time of travel of the measuring light pulse is considered to be concluded (actually it is concluded when measuring light pulse passes the receiver lens).

For the sake of clarity and ease of understanding $t_1$ and $t_2$ (and below: $\delta$) have been exagerated with respect to $\tau$.

Since $t_3$ arrives at a time later than $t_2+\tau$, the receiver is in a condition to receive and process the measuring light pulse for producing the stop signal.

As will be appreciated from the foregoing illustration, the time of travel of the measuring light pulse is $t_3-t_1$. This value can easily be obtained from the measured value $t_3-t_2$ according to the equation:

$$t_3 - t_1 = t_3 - t_2 + t_2 - t_1$$

since $t_2$ and $t_1$ are constant values in the measuring apparatus they can be taken into account by suitable calibration.

If, perchance for short distance targets the short reference light path branch is connected by switch 38 for connection with reference light path 28 because a considerable shorter distance is to be measured, $t_{3'}$ will fall within the period of time $t_2+\tau$ as seen in the illustration below:

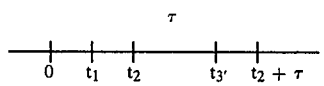

In consequence, the receiver will not produce a stop signal for the time measurement which was initiated at $t_2$. The central control 10 detects the "endless" time measurement, stops it and disables the short reference light path branch and activates instead the long reference light path branch and provides a trigger via line 8 for separation of a new light pulse in accordance with the following illustration:

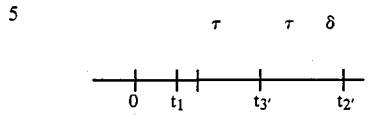

In the above illustration, $t_{3'}$ is the same as in the preceding diagram since the distance to the target has not changed. However, the measuring light pulse arriving at $t_{3'}$ at the receiver is the first of the two pulses to arrive and is used to initiate the start signal for the time measurement.

The reference light pulse delayed by the reference light path branch by $2\tau+\delta$ (wherein $\delta$ has any value greater than zero) arrives much later at the receiver, namely at $t_2$, to generate the stop signal terminating the distance measurement.

In this case, the time of travel of the measuring light pulse is $t_{3'}-t_1$ and is calculable from the measured value $t_{2'}-t_{3'}$ according to the following equation:

$$t_{3'} - t_1 = (t_{2'} - t_1) - (t_{2'} - t_{3'})$$
$$= 2\tau + \delta - (t_{2'} - t_{3'})$$

Since $2\tau+\delta$ is a constant value determined by apparatus design it may be taken into account by calibration.

The foregoing applies even for very short distances $t_3$ which may be much closer to $t_1$ than as shown in the above illustration. Time $t_{3'}$ will coincide with $t_1$ for a target of zero distance.

It will be seen from the foregoing that the measured time $\Delta t$, $t_{2'}-t_{3'}$, is not in itself determinative of the time of travel $\Delta T$ of the measuring light pulse, but is related to it by way of the equation $\Delta T = 2t + \delta - \Delta t$; $2t+\delta$ being the delay caused by the light guides 25, 34 and 27 which are precisely determinable.

It will be seen from this that using the apparatus of the invention, it is possible to take measuring results for ranges between 0 cm and the upper distance limit of the measuring apparatus with an unchaning, absolute resolution or accuracy better than ±1 cm. Because, as noted earlier, the long reference light path branch 34 may be of the order of about 600 m long, it may be necessary, for getting this degree of accuracy, to take into account temperature dependent changes in length of the long reference light path branch 34. This may be done by having a middle position for switch 38 in which it lets through a part of the reference light pulse coming by way of the short reference light path branch 27 and a part thereof coming by way of the long reference light path branch 34. If steps are taken to see that no measuring light pulse is received in this position of the switch, the difference in time between these two reference light pulses may be measured so that it is possible to get a correction value for a change in the transit time established by the long reference light path branch 34 or fiber optic.

An other possible way is that of measuring the temperature inside the measuring apparatus and working out a correction value, for the delay $2\tau$, therefrom.

As may furthermore be seen from FIG. 1, the signal produced by amplifier 20 is not only fed to the first comparison circuit 22 for producing a time-related measurement signal, but also to a second comparison unit 41 for comparison of the amplifier signal with a given or preset reference voltage having a value of the same as the upper limit of the linear range of amplifier 20. If the value were greater than the upper limit of this linear range, aberrations in time related distance measurements may result. For example, the zero-transitions of the signal from the amplifier 20 may be changed in relation to the time of excitation of the resonance system 18 so that there no longer exists the desired correlation between the start of a time-related distance measuring signal and the time of reception of the driving light pulse by the resonance system 18.

In a measuring apparatus which is operated both for greatest possible distance measurement utilizing high power transmitters and high sensitive receivers and which is to be also capable of precise distance measurement of nearby targets which may be highly reflective, amplifier 20 may in such circumstance be saturated because the amplitude of the signal produced by the resonance system 18 is a function of the strength of its excitation, that is to say on the brightness of the light pulse received by photodiode 17. If such saturation or over-loading of amplifier 20 occurs, this will be detected by the second comparison unit 41, which, by way of lead 42, will supply a saturation signal to the central control 10, which, in response to that signal, nullifies the measuring operation and repeats under conditions now to be made clear.

A sub-assembly composed of amplifier 20 and first comparison circuit 22 in the receiving channel 16 may be designed with a dynamic range of about 15 for distance resolution of better than ±1 cm; i.e. the ratio of 1:15 between the smallest signal which can be sensed and processed by the first comparison circuit 22 and the largest signal that follows within the linear range of amplifier 20 as monitored by the second comparison unit 41.

When the central control 10 detects from a saturation signal produced by second comparison unit 41 that amplifier 20 is operating beyond its linear range, central control 10 sees to the repetition of the distance measurement and to the resonance system 18 being less strongly excited by, for example, reducing power transmission and/or the sensitivity of the measuring system at the receiving end. The wording "damping the received signal" is used to cover both of these possibilities.

It is significant that after saturation of the amplifier 20 on occurrence of which the second comparison unit 41 provides a signal, the repeated attempt at distance measurement be undertaken only with an attenuation which is less than the noted dynamic range of 1 to 15. If distance measurement were undertaken, following a failed attempt, with an attenuation factor of, for example 20, no signal would again be available for processing by first comparison circuit 22 especially if there had been only a small degree of saturation of amplfier 20 in the preceding attempt.

For this reason, the assembly 20, 22 by virtue of its dynamic range, establishes in a single attenuation step a maximum or base-attenuation which is not to be exceeded.

If on repetition of attempted distance measurement the received signals are attenuated at a base-attenuation such that amplifier 20 remains saturated, further attenuation is provided by further attentuation stages until amplifier 20 works in its linear range.

These attenuation stages may take various forms as will be seen from the following.

One form involves changing the power output of the transmitting diode 3, which may be expected with different charge levels of the energy storage device (i.e. capacitor) in circuit 4. The trigger for this signal is supplied by the central control 10 in the embodiment of FIG. 1 by way of wire 43. Power transmission may be changed to provide an attenuation ratio of the order of 1 to 4.

Attenuation may also be effected by changing the sensitivity of the receiving-photodiode 17 by changing the biasing voltage thereof, the degree of attenuation depending on the type of diode used and may be within a range of 1:6 to 1:7. In the embodiment of FIG. 1 the level of attenuation may be controlled with the biasing voltage control 44 in turn controlled by signals supplied by lead 45 from the central control 10.

A third attenuation form which may be resorted to involves use of a variable factor optical attenuation unit 46 in the light path 15 between the receiving optical system 14 and the photodiode 17, the attenuation factor of the variable optical attenuation unit 46 being changeable under control of signals supplied from central control 10 by lead 47.

The optical attenuation unit 46 may be, for example, an iris diaphragm the opening of which may be opened and shut in stages. However, we prefer to use an attenuation unit of the kind hereinafter described with reference to FIG. 5 capable of providing an attenuation factor for example in the range of 1 to 160. This attenuation factor range as will be appreciated is larger than the dynamic range of amplifier 20 and the first comparison circuit 22 connected therewith.

If the second comparison unit 41 provides a saturation signal in a first attempt at distance measurement using full transmitter power and with full sensitivity of the measuring apparatus, then for a following distance measurement attempt, it is obvious the full attenuation of unit 46 should not be resorted to. In fact it is advisable to first change power output and/or receiver sensitivity for obtaining distance measurement results. If on repetition of an attempt to measure distance with changed condition in power output and/or receive sensitivity amplifier 20 is again saturated, further attenuation should be introduced with power and/or receiver sensitivity control so that relatively small attenuation increases may be introduced. In this way, in succeeding distance measurement attempts attenuations of, for example, 1:24 to 1:28 may be obtained. Should this still saturate amplifier 20, then in place of the attenuation modes described the optical attenuation unit 46 may be placed in operation, its attenuation factor of 1:160 being smaller than the product of the exemplified attenuation factor 1:24 times the dynamic range 1:15 of amplifier 20 and the first comparison circuit 22 connected therewith.

If, using the attenuation unit 46 by itself, the amplifier 20 is still saturated, then the other attenuation modes described may be placed in operation. With the attenuation modes described, if cumulatively combined it is possible to obtain an attenuation dynamic range higher than 1:55000. If in addition a filter with an attenuation range of for example 1:55000 is used the dynamic range may be increased to $1:3.10^9$, making possible use of very high transmitting power and a highly sensitive receiver for measuring very large distances and on the other hand, for high reflecting targets, exceptional accuracy for near target distance measurement with no lower limit for distance measurement of the target.

Best resolution is attained if the amplitudes or light intensities of the measuring and reference light pulses (used for long distance targets) for starting and stopping time of travel measurement are as far as possible equal. Because the intensity of the measuring light pulse may be changed within wide limits (as aforenoted), in order to "match" the reference light pulse intensity with the measuring light pulse, a variable attenuation unit 48 is provided in path 28 and is controlled by signal supplied by lead 49 from central control 10.

As earlier described, in place of the two-way switch 38, two controlled attenuation units may be substituted (as for example double-refracting ceramic wafers). Such wafers may be used as well for the mentioned control of the intensity of the reference light pulse for matching the intensity of the light pulse. If such attenuation units are used, the attenuation unit 48 of FIG. 1 can be dispensed with.

Figure 2:
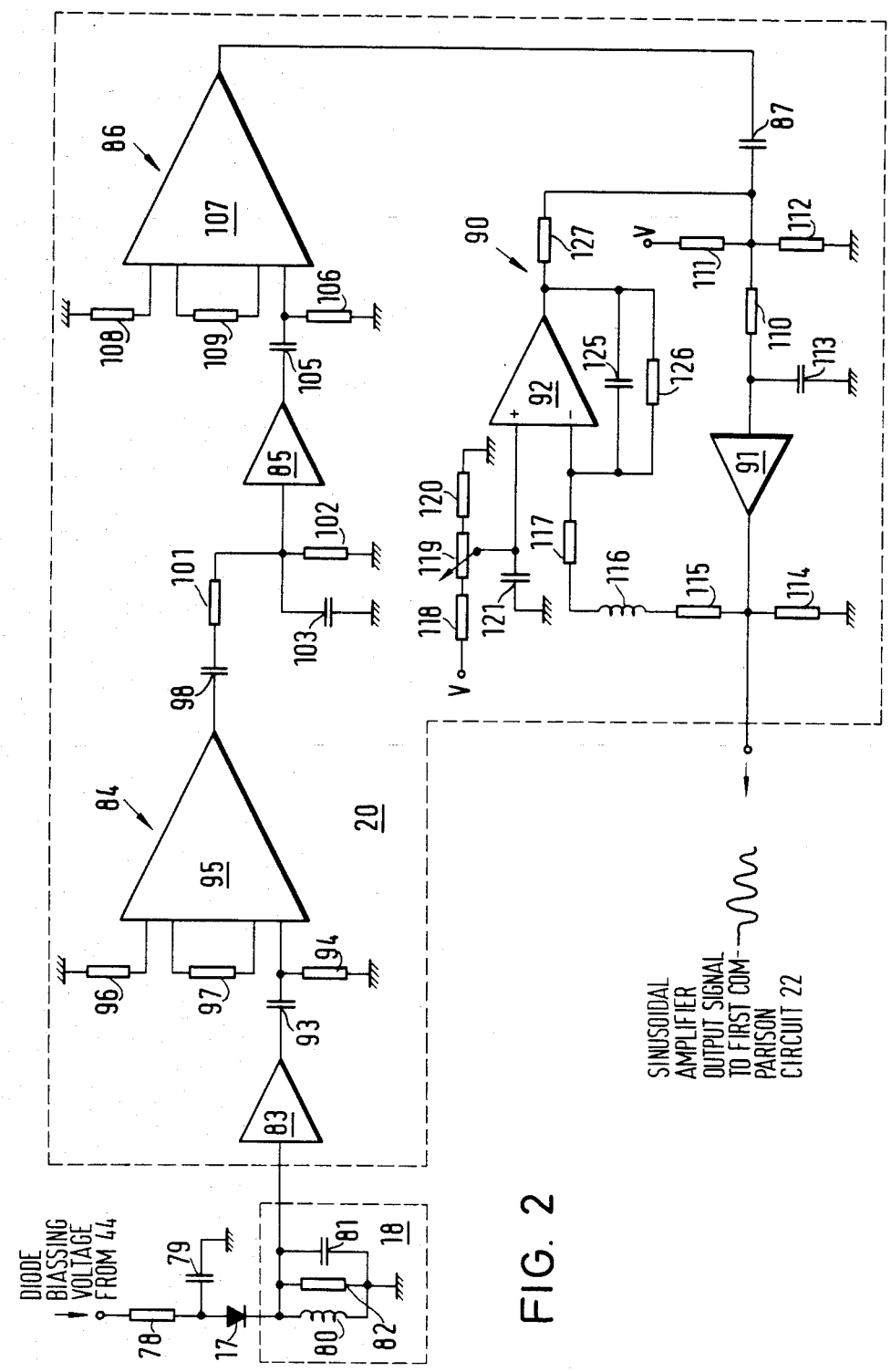
FIG. 2 is an electric schematic diagram of parts 17,18 and 20 of FIG. 1.

An important part of the measuring apparatus of the invention is that the resonance system 18 receives the output of electro-optical receiver photodiodes 71 which is supplied with a supply voltage, as seen in FIG. 2, by way of a resistor 78 and a smoothing capacitor 79. Advantageously, resonance system 18 is made up of a parallel resonant circuit which forms the working resistor of photodiode 17. The circuit is made up of a coil 80, the internal junction capacitance of the photodiode 17, a further external capacitance 81 and resistance 82, the resistor and the external capacitance being in parallel connection with coil 80.

Figure 4:
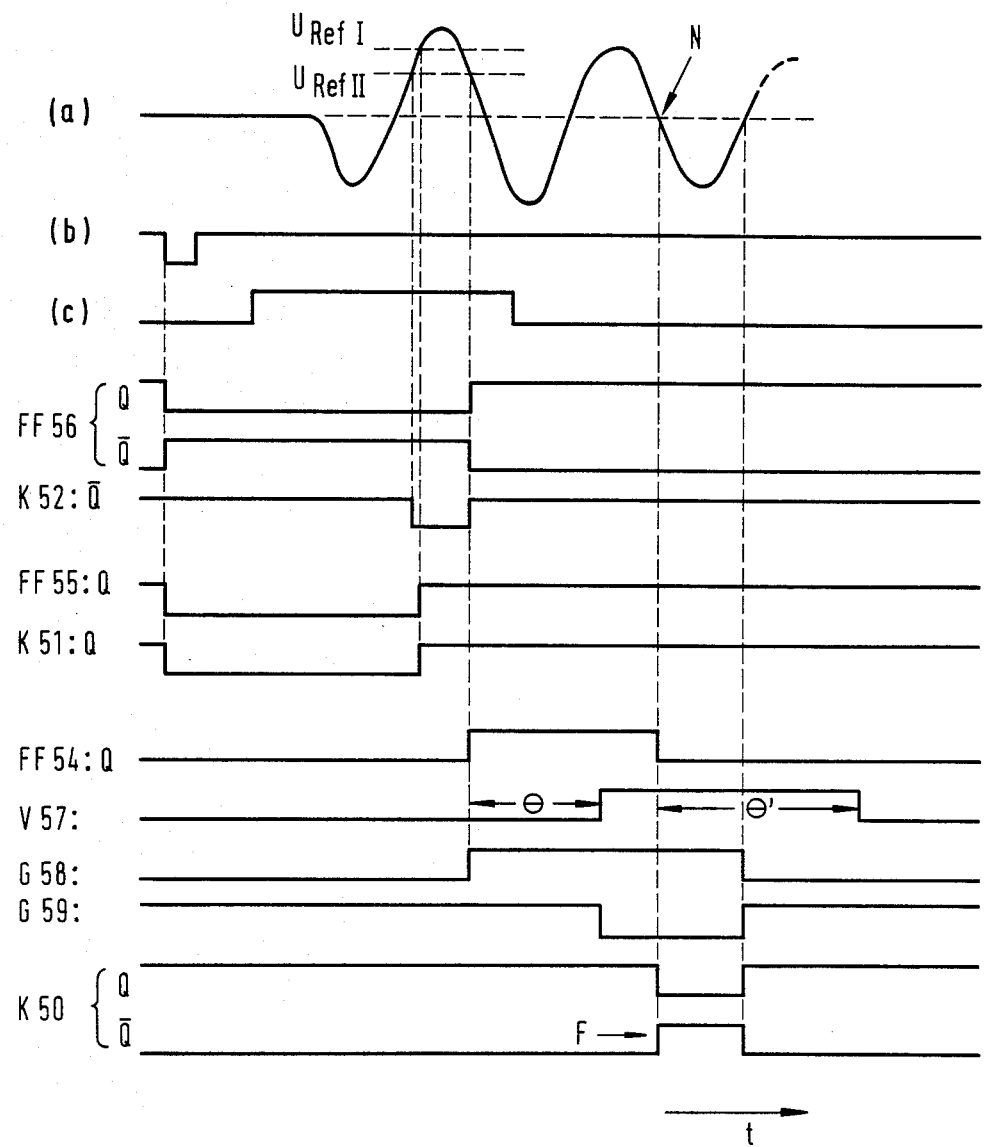
FIG. 4 is a signal timing diagram for explaining the operation of the circuit of FIG. 3.

This resonance system is excited on receipt of a light pulse by photodiode 17 to generate a sine-law oscillation, the second half-wave of which has the greatest amplitude, the amplitude then decaying exponentially (see FIG. 4).

It is to be understood that at least for the short time that it takes, even for long distance targets, for the reference light pulse and the measuring light pulses to be received by the receiving-photodiode 17, the zero-transitions of this exponentially decaying oscillation event are accurately related in time with the exciting light pulse received by the photodiode 17. This is also true for the zero-transitions of the output signal from amplifier 20 so long as the amplifier is not saturated or overloaded, that is to say the amplifier is operated within its linear range.

For the foregoing reasons, it will be appreciated the zero-transitions of the output signal of amplifier 20 may be used for producing a time-related distance measurement signal; i.e. the start and stop signal used for measuring the time of travel of the measuring light pulse.

With reference to FIG. 2, amplifier 20 includes an impedance converter 83 as an input stage, whose function it is of matching the relatively high output impedance of resonance system 18 to the lower input impedance of following first amplifier stage 84. The output signal of stage 84 is supplied by a further impedance converter 85 to a second amplifier stage 86, each stage of this two-stage design having a relatively low gain of about 1 to 10 with the advantage of much lower oscillation tendencies than a single-stage amplifier with a corresponding gain of 1 to 100.

The output signal of the second amplifier stage 86 is coupled by capacitor 87 to an automatic control circuit 90 for monitoring the direct voltage zero level constant. Circuit 90 includes a third impedance converter 91 and has in a feedback path a normal low-drift operational amplifier 92. The output direct voltage is stabilized against temperature-related fluctuations and drift effects which may result from component aging. To this output direct voltage an amplified decaying, sine-law oscillation signal is superimposed which is produced when the resonance system 18 is excited by a light pulse received by photodiode 17. The decaying oscillation is fed, as previously described, to the first comparison circuit 22 for producing the start or stop signal, the first comparison circuit 22 being illustrated in greater detail in FIG. 3.

For amplifier 20, IC's as marketed by, for example, National Semiconductor under number LH 0033-CG may be used for impedance converters 83, 85 and 91.

Each amplifier stage 84 and 86 is a programmable amplifier available from Advanced Micro Devices, type No. AM 733-T. In the feedback path of the automatic control circuit 90, there is an operational amplifier 82 available from Analog Devices, type No. AD 741 LN. FIG. 2 provides details of circuit parts required for signal processing, current supply circuits available from the data sheets for the IC's not being illustrated in the interest of ease of disclosure of the salient features of the invention.

As may be seen from FIG. 2, the output signal of the impedance converter 83 is fed by an RC device comprising a coupling capacitor 93 and a grounded resistor 94 as a first input to the programmable amplifier 95 of the first amplifying stage 84 while the second input of amplifier 95 is grounded by way of resistor 96. Between the programming inputs, there is provided a programming resistor 97 for fixing the gain of this amplifier stage.

The output signal of the first amplifier stage 84 is fed by way of capacitor 98 and a voltage divider formed by resistors 101 and 102 to the input of second impedance converter 85, the input being from the junction of resistors 101 and 102, filtering capacitor 103 for eliminating RF interference being connected in parallel with resistor 102.

The output signal of impedance converter 85 is coupled by capacitor 105 and grounded resistor 106 to the input of programmable amplifier 107 of the second amplifier stage 86, the second input of programmable amplifier 107 being grounded through resistor 108. The gain of this amplifier stage is determined by programming resistor 109. The two-stage design of amplifier 20 makes possible for the overall gain to be fixed as desired with a very high degree of accuracy using the two separate programming inputs.

The alternating voltage output signal of the second amplifier stage 86 is fed by capacitor 87 and input resistor 110 to the input of the third impedance converter 91, whose input direct voltage is fixed by the voltage divider formed by resistors 111, 112 connected between a voltage source and ground. To maintain the output direct voltage of the impedance converter 91 constant, the input direct voltage is controlled by means of the output (supplied to the junction of resistors 110, 111, 112 and capacitor 87) by way of the feedback path, of automatic control circuit 90. Capacitor 113 as connected in FIG. 2 suppresses RF interference.

The output of impedance converter 91 is connected to the junction of grounded resistor 114 and resistor 115 and from the latter to a choke 116 for suppressing alternating voltage components, and by way of resistor 117 to an inverting input (−) of operational amplifier 92, whose non-inverting input (+) is connected to a reference potential by means of a voltage divider made up of resistors 118, 119 and 120, the reference potential being kept free of RF interference by filtering capacitor 121. The output signal of operational amplifier 92 is fed by way of the feedback path (made up of capacitor 125 and resistor 126) to the inverting input (−) of the operational amplifier 92 and by way of resistor 127 to the junction point of resistors 110, 111, 112 and capacitor 87.

Figure 3:
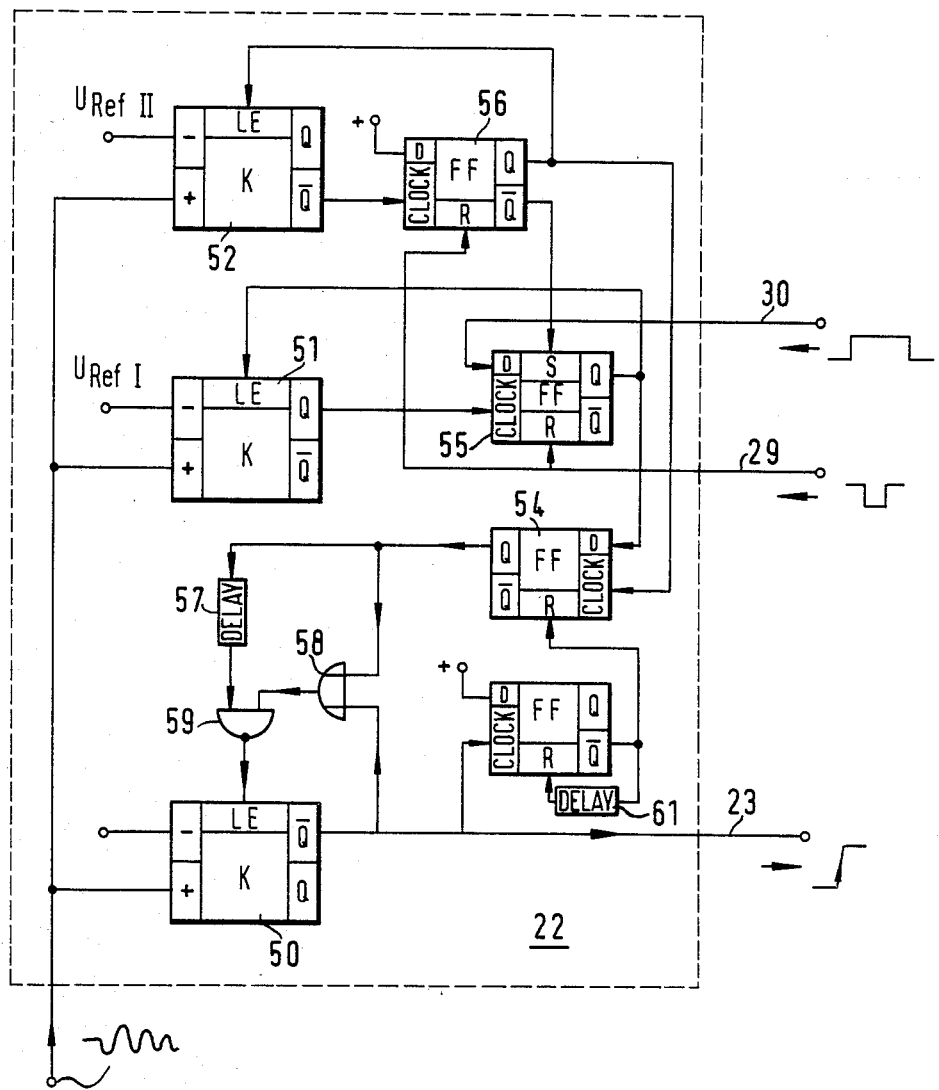
FIG. 3 is a schematic diagram of circuit 22 of FIG. 1.

A preferred form of the first comparison circuit 22 for producing time-related distance measurement signals is shown in FIG. 3. A shown at the bottom left-hand lower end of FIG. 3, the oscillation signal from amplifier 20 is fed to three comparison units 50, 51 and 52 for comparison thereof with different, predetermined levels. Such comparison units constitute components available from Advanced Micro Devices (type AM 686-CM) or from Plessey (type SP 9685-CM).

The comparison units 50, 51 and 52 have digital outputs Q and $\overline{Q}$, at which they provide a logical 1 or a logical zero as an output depending on whether the measuring signal voltage at their plus-inputs is greater or smaller than a reference voltage supplied to the minus-inputs.

A further common point for these units is that they all have "latch enable (LE) inputs" by which they may be latched and enabled. In the enabled condition, the output signal at the Q and $\overline{Q}$ outputs is changed every time the said voltage is greater than or less than the predetermined reference voltage, while in the latched condition the logic level last to be produced is maintained and latched at these outputs, that is to say it is stored or memorized until enabling again takes place. These units may differ insofar as some give TTL-signals and at their LE-input are in need of a logical zero for enabling while others are compatible with ECL-components, a logical one being needed at their LE-input for enabling them.

In the embodiment of FIG. 3, the system is exemplified as keyed to TTL-compatible comparison units only. In a more specially preferred embodiment, units 51 and 52 comprise TTL-comparison units while unit 50 comprises an ECL-compatible unit. In this specific case, the outputs of comparison unit 50 in FIG. 3 will have to have ECL/TTL-level translators if the rest of the system uses TTL-logic and additionally an inverting TTL/ECL voltage translator or converter will have to be used on the input side of the LE-input of such comparison unit.

The overall purpose of the first comparison is to detect whether resonance system 18 has been excited as desired, and then detecting a predetermined zero transition of the decaying oscillation signal and using it for producing a time-related distance measuring signal; i.e. the start or stop signal.

This last-named operation is afforded by the zero-transition comparison unit 50 which at one input (+) (see FIG. 3) receives the signal from amplifier 20, while the other input (−) is supplied with the zero level.

Bearing in mind that when resonance system 18 is not oscillating, a signal representative of the zero level will be produced at the output of amplifier 20, the zero level at the one input (+) of comparison unit 50 with even the smallest fluctuation, as may be caused, for example, by noise or interference signals in the amplifier output signal, may cause unit 50 to produce representative signals at its output. For this reason, it is necessary for zero level comparison unit 50 to be normally latched or locked by way of its LE-input and only to be enabled, when resonance system 18 has in fact been excited.

This is detected by the comparison units 51, 52, of which the first one undertakes comparison of the output signal of amplifier 20 with a first reference voltages $U_{Ref\,I}$ different from the zero level, such voltage defining the lower limit of the signals which may be processed by receiving channel 16. As mentioned, the greatest amplitude of each oscillation produced by resonance system 18 is dependent on the intensity of the exciting light pulse. Also, as previously noted, for the sub-assembly made up of amplifier 20 and first comparison circuit 22 in receiving channel 16, a dynamic range of about 1 to 15 may be obtained for distance measuring resolution of better than ±1 cm.

The reason for this is that the linear range of amplifier 20 makes it possible to have, for example, output signals with an upper limit of 1500 mV. Thus for oscillations from resonance system 18 whose greatest amplitude is below 100 mV, may not be processed with the desired accuracy because the signal-to-noise ratio may be so bad that a resolution of better than ±1 cm would no longer be possible.

For the foregoing reason, it is best for the voltage $U_{Ref\,I}$ to be fixed at a value signal to 100 mV and to process only those oscillations whose peak amplitude has an absolute value greater than the reference value of 100 mV.

A problem with use of comparison unit 51 for this comparison is that, it having to react to oscillations with a greatest amplitude of above 100 mV say, for example, 100.5 mV as well as to oscillations with a peak amplitude of 1500 mV, this comparison may, be overdriven in a range from 0.5 mV to 1400 mV.

Unfortunately, the reaction time of the component of which this comparison unit 51 consists, depends on the value of the overdrive voltage. If this value is greater than 5 mV, it will produce an output signal with a very short delay of say, 20 ns, this delay being always the same. However, it may take up to 100 ns before the desired signal is produced at the Q-output of comparison unit 51 if the output signal of amplifier 20 exceeds the reference level $U_{Ref\,I}$ by only a very small amount; i.e. by less than 5 mV. The possible result of this is that the zero level comparison unit 50 which is to be enabled by the output signal of comparison unit 51, may make use of the wrong zero-transition of the amplifier signal 20 thereby producing a start or stop signal at the wrong time resulting in significant measuring errors.

To eliminate this possibility, the comparison unit 52 is ued to compare the output signal of amplifier 20 with a second reference voltage $U_{Ref\,II}$, whose absolute value is about 25 to 30% smaller than the absolute value of $U_{Ref\,I}$. Furthermore, the two comparison units 51 and 52 have a logical gating circuit (made up in the present embodiment of a flip-flop 54) for only enabling the zero level comparison unit 50 when the signals produced by comparison units 51 and 52 (when the output voltage of amplifier 20 becomes greater than or again becomes less than their reference level at the time) are produced in the right order. Because voltage $U_{Ref\,II}$ of comparison units 52 is far less than the smallest maximum amplitude which is to be processed, there will be significant overdriving of this comparison unit even with the smallest voltage values which are just a little greater than the reference level of comparison unit 51, and hence a delay in the output signal will not take place. Thus if comparison unit 51 indicates that its reference voltage has been exceeded by the output voltage of amplifier 20 before comparison unit 52 indicates that the output voltage of amplifier 20 has fallen below a value less than its reference voltage $U_{Ref\,II}$, this sequence of output signals of comparison units 51 and 52 is an indication that no output signal delay has occurred in comparison unit 51.

To determine whether the described conditions are adhered to, using the signal produced at the Q-output of comparison unit 51, acting by way of intermediate latch flip-flop 35 (whose uses will be made clear later on), the data input of flip-flop 54 is put at a logical 1. By this step (and only on taking this step) is flip-flop 54 ready for reaction to a signal supplied by way of a further latch flip-flop 56 to its clocking input, such signal indicating that the value in question has gone to a level below that of the voltage $U_{Ref\,II}$.

Next, a logical one will be produced at the Q-output of flip-flop 54, such signal going by way of a delay circuit 57 and a NAND-gate 59 to the LE-input of the zero level comparison unit 50 for enabling the same, so that on the next zero-transition of the amplifier signal, it will be outputting respective signals.

In accordance with the invention, the time constant $\theta$ of delay circuit 57 is made such that it is not the next zero-transition after the setting of the flip-flop 54 that is selected but a later zero-transition, more specifically, the fourth one, which is detected by comparison unit 50 and used for producing a time-related distance measuring signal. The reason for using the later-zero-transition at this point in time is that it is relatively late in comparison with the transmitting of a measuring light pulse and will thus be highly unlikely to be influenced by interference voltages caused during transmission of a light pulse.

The time-related distant measuring signal, which is related in time to the detected zero-transition, is provided in the embodiment of FIG. 3 at the $\overline{Q}$-output of zero level comparison unit 50.

When the output signal of amplifier 20 falls to a value under the zero level, a logical one will be produced at the $\overline{Q}$-output, which thus far produced a logical zero. The rising edge of the signal then produced, is used as a time-related distance measuring signal for starting or stopping the light pulse time of travel measuring operation.

At these times when it is not possible for resonance system 18 to be excited because no measuring light or reference light pulse is supplied to the photodiode 17, steps must be taken to see to it that there is no reaction of comparison units 51 and 52 to any chance interference signal which might undesirably enable comparison unit 50. The same applies to ensuring that comparison units 51 and 52 will react only to that half-wave (generally the second half-wave) with the highest amplitude during a given oscillation and that there will be no reaction to later half-waves.

For this reason, it is best for comparison units 51 and 52 to be latched or locked during the time between the individual light pulse transmissions and for them to be enabled only a short time before expectation of receipt of a measuring light pulse or reference light pulse by the photodiode 17. Unit 51 is thereafter immediately again locked. This is done with the help of the latch flip-flops 55 and 56, whose Q-outputs are "normally" at a logical one and, for this reason, have the effect of latching the related comparison units 51 and 52 by way of their LE-inputs. They are only freed from this condition shortly before the time in which a light pulse is to be received by the photodiode 17 by way of a reset signal supplied by way of lead 29.

A function, along generally the same lines above described, is produced for the zero level comparison unit 50 not only by flip-flop 54, but furthermore by its own $\overline{Q}$ output, such output latching, by way of OR-gate 58 and NAND-gate 59, the LE-input in the resting condition till the flip-flop 54 is set and at once (that is to say without delay) after the reaction of the zero level comparison unit 50 the same is locked again once the zero level comparison unit 50 has returned to its starting condition.

It may occur that although a light pulse is transmitted and furthermore a reset signal is produced at lead 29, no light pulse is reflected back by the target to photodiode 17 which is strong enough to sufficiently excite resonance system 18 so that its oscillation signal, amplified by amplifier 20, has an amplitude greater than the two reference levels of comparison units 51 and 52. The net effect of this would be that comparison units 51 and 52 would remain in their enabled condition for a relatively long time, during which their might be a reaction by them to strong interference signals so that an incorrect time-related distance measuring signal might be produced, which would produce wrong distance values. To cope with this problem, the data input of flip-flop 55 does not get a logical one at all times (which would make possible reaction of this flip-flop to a control signal from comparison unit 51). The data input gets a time slot signal from the central control 10 through lead 30, such signal jumping to the level of a logical one at the same time as, or shortly after, the reset signal appears on lead 29, the signal furthermore keeping to this level until, after transmission of the light pulse, a certain time has elapsed, which corresponds to the time of travel of a measuring light pulse for the longest range of a target. Thereafter, the time slot signal goes back to a logical level of 0 so that flip-flop 55 will no longer be set by reaction of comparison unit 51 to any chance interference and, for this reason as well, flip-flop 54 may not be put into a condition in which the zero level comparison unit 50, designed for producing the time-related distance measuring signal, is enabled.

As will be seen from FIG. 3, first comparison circuit 22 has a further flip-flop 60, whose data input is at a logical one all the time and whose clocking input is controlled by the $\overline{Q}$-output of the zero level comparison unit 50 and those $\overline{Q}$-output is joined up directly with the reset input of flip-flop 54 and by way of delay circuit 61 is joined up with the reset input of flip-flop 60 itself.

The purpose of this flip-flop 60, designed for resetting itself after a certain time has gone by as fixed by delay circuit 61, like a one shot multivibrator, is, (a) to reset flip-flop 54 at once and every time that there is a reaction of zero level comparison unit 50, after being enabled, to the first zero-transition of the oscillation from amplifier 20, and (b) on turning on the complete system, to see that there is no disabling of first comparison circuit 22, something which would make measuring operations impossible.

The invention will be better understood as explained with reference to FIG. 4, in which the output signals of the first comparison circuit 22 are related to the production of an oscillation event by resonance system 18 shown at (a) as the output of amplifier 20. For a relatively low intensity light signal, the resonance system 18 will produce a signal the second half-wave of which has the greatest amplitude, although small, is larger than the reference level $U_{RefI}$, the level being such there will be no delay in the output signal of comparison unit 51 as earlier noted.

As seen in FIG. 4, in the rest condition, before occurrence of the oscillation event, the Q-outputs of the flip-flops 56 and 55 are, in each case, at a logical one so that the parallel comparison units 51 and 52 are latched or locked.

The same is true furthermore for comparison unit 50 which, by way of its NAND-gate 59 joined with its LE-input, is latched when there is a logical zero at at least one of two inputs of this gate 59. In the resting condition to be seen on the far left in FIG. 4, this logical zero not only comes from the OR-gate 58 (whose two inputs each get a logical zero stemming from the $\overline{Q}$-output of comparison unit 50 and, in the other case, from the Q-output of the flip-flop 54 which, at this point in time, is reset), but also by way of delay component 57 from the Q-output of the flip-flop 54.

Thus it will be appreciated that all comparison units 50, 51 and 52 are locked or latched while the $\overline{Q}$-output of comparison unit 52, the Q-output of comparison unit 51 and the Q-output of comparison unit 50 each shows a logical one, which is retained from the time of detection of an earlier oscillation event.

As we have described earlier, first comparison circuit 22 would not, in this condition, be in a position to detect an oscillation event at the output of amplifier 20 and, for this reason, shortly before a transmitted light pulse gets to photodiode 17 a reset signal (see (b) in FIG. 4) is produced by central control 10.

Because of this reset signal, the logical one at the Q-output of flip-flop 56 is changed into a logical zero so that comparison unit 52 is enabled, without, however, changing its output signal, because, in fact, a zero level signal is outputted by amplifier 20, such signal being lower than the reference voltage $U_{RefII}$ as monitored by comparison unit 52.

Moreover, flip-flop 55 having been reset by the reset signal, a logical zero will be produced at its Q-output for enabling comparison unit 51. At this time the output signal at the Q-output of comparison unit 51 is changed at once into a logical zero, because, as will be clear, this comparison unit gets (from amplifier 20) an input voltage which is smaller than the reference voltage $U_{RefI}$ it is in the process of monitoring.

Because of the time slot signal (c) in FIG. 4, and which in the present embodiment comes somewhat after the reset signal, the data input flip-flop 55 is switched over to a logical one so that this flop-flop is now ready for a control signal (from comparison unit 51) which is to be supplied.

The Q-output of the flip-flop 54 is now in the resting condition occurring before the oscillation event and is at a logical zero, which is present at the output of the delay component 57 as well. Because of this logical zero, a logical one is produced at the output of NAND-gate 59 latching comparison unit 50, unit 50 being then in a condition in which there is a logical one at its Q-output and a logical zero at its $\overline{Q}$-output. The last-named logical zero is responsible for producing, in connection with the logical zero at the Q-output of flip-flop 54, a logical zero at the output of the OR-gate 58.

If now, after a certain lapse of time, the oscillation event, amplified by amplifier 20, takes place, comparison units 51 and 52 will be enabled, zero level comparison unit 50, however, still being latched.

As will be seen from FIG. 4, the signal coming from the amplifier 20 will, in the second oscillation half-wave, firstly go to a level greater than the lower reference voltage $U_{RefII}$ so that the Q-output of comparison unit 52 will be changed from a logical one to a logical zero. This does not have any effect, however, because there will only be a reaction of the clocking input (or flip-flop 56, joined with the Q-output of comparison unit 52), to a rising pulse edge.

Later in the process, the signal coming from amplifier 20 will become greater than the greater reference voltage $U_{RefI}$ as well, whereby the Q-output of comparison unit 51 will be turned from a logical zero to a logical one, the resulting rising pulse edge triggering the clocking input of the flip-flop 55 (which has been enabled by the time slot signal, which is at logical one, at its data input) so that there will be a logical one at this Q-output as well, such signal on the one hand latching comparison unit 51 at once (so that as things go on, it will go on keeping the logical one to which its Q-output has now been put) and which on the other hand, by way of the data input of flip-flop 54, gets the same ready for receiving a clock signal.

Such clock signal is produced because the output signal of amplifier 20 after going through the top of the half-wave of the oscillation firstly goes through the upper reference voltage (this being without effect) and then goes through the lower reference voltage $U_{RefII}$, this having such effect that the Q-output of comparison unit 52 changes the logical zero to a logical one, the rising pulse edge so produced triggering the flip-flop 56, whose data input is at logical one all the time, so that at its Q-output as well, a rising pulse edge going from logical zero to logical one will be produced, such pulse edge triggering flip-flop 54 only under the condition that its data input gets a logical one as stored by flip-flop 55.

If a delay takes place in the output signal of comparison unit 51, caused by low overdrive, flip-flop 56 is switched before flip-flop 55 and flip-flop 54 is kept in its reset condition, whereby the zero level comparison unit is kept in the locked or latched condition. In this respect, it is possible to make certain that no zero transition of the output signal of amplifier 20 which is different from the desired fourth transition, is used by the zero level comparison unit 50 for producing a time-related distance measuring signal.

To the same end, the logical zero, produced at the $\overline{Q}$-output of flip-flop 56, on setting the same, is used to positively set flip-flop 55 so that comparison unit 51 is kept latched. If signals are produced and timed in the desired way, flip-flop 55 will, in any case, have been set on switching flip-flop 56 so that the set pulse coming from the Q-output of flip-flop 56 will be without any effect.

As may be seen from FIG. 4, in case of regular signal production and timing, the Q-output of flip-flop 54 is changed over, at nearly the same time as the switching of flip-flop 56, to a logical one, which then (a) goes straight-way to the OR-gate 58 and terminates by way of the logical one then produced at its output, the latching effect of the $\overline{Q}$-output (which at this point in time is still at logical null) of the zero level comparison unit 50 and (b) goes by way of delay component 57 to gate 59 with a time delay of $\theta$. The output of gate 59 will then go from the logical one it has been at so far to a logical zero so that the zero level comparison unit 50 will be definitely enabled.

In this respect, the delay time θ is such that, at this enabling point in time, the output signal of amplifier 20 is on the point of going through the fourth (second positive) half-wave so that the zero level comparison unit 50 will detect the next zero-transition from the positive to the negative part and designated by arrow N in FIG. 4. If this zero-transition occurs at a time free of interference voltages, the $\overline{Q}$-output of the zero level comparison unit 50 is changed over from the logical zero then in existence to a logical one, the rising pulse edge F so produced being used as a time-related distance measuring signal for starting or stopping the light pulse time of travel measuring operation in question and, at the same time triggering flip-flop 60 which so far has been reset; the logical zero then produced at its $\overline{Q}$-output then goes with the delay, produced by the delay circuit 61, to the reset input of flip-flop 60 so that, after a given time, the same is reset to its starting condition, that is to say its $\overline{Q}$-output returns to logical one. The logical zero, produced for a short time when this occurs, goes, however, to the reset input of flip-flop 54 as well, it causing the Q-output of this flip-flop to be switched back from logical one to logical zero.

This logical zero is delayed by the delay circuit 57 by a time equal to θ' (which is greater than the delay θ produced on changing over to logical one) and at first is of no effect at the input of the OR-gate 58, because its other input still gets the logical one from the Q-output of the zero level comparison unit 50, it going through to the output of OR-gate 58. At the output of NAND-gate 59, for this reason, a logical zero will be maintained, it enabling the zero level comparison unit 50 until the signal from amplifier 20, after going through the fifth half-wave has become greater than the zero level while going positive. When this occurs, there will be a reaction of the zero level comparison unit 50 so that its Q-output goes back to a logical one and its $\overline{Q}$-output goes to logical zero, the logical zero in connection with the logical zero present at this time at the Q-output of flip-flop 54 acting by way of OR-gate 58 at the input in question of the NAND-gate 59 so that a logical zero is produced and so that the zero level comparison unit 50 is latched in the condition which it has gone into and which is the right condition for the processing of an oscillation signal. A short time later, the output of the delay circuit 57 is changed over to logical zero so that there is now, once again, a double-latching of zero level comparison unit 50.

Furthermore, all comparison units and flip-flops of the first comparison circuit 22 are latched, all such parts, as may be seen at the right hand side of FIG. 4, having gone into switching conditions, which are maintained until the next resetting pulse.

As we have seen earlier, the effect of flip-flop 60 is that the logical one produced at the $\overline{Q}$-output of the zero level comparison unit 50 (on reaction of the same) is changed, generally speaking, with no delay into a logical zero, thus resetting flip-flop 54. The same function may be produced by joining the Q-output of the zero level comparison unit 50 (which, on reaction of the comparison unit goes to logical zero) directly with the reset input of flip-flop 54. However, a possible outcome of this would be that on turning on, when the outputs of the separate components go to a logical one or a logical zero completely at random, a logical zero might be produced not only at the Q-output of the zero level comparison unit, but furthermore at the Q-output of flip-flop 54 so that the two components will have the effect of disabling each other.

For stopping this, flip-flop 60 is used which for a short time is maintained in the condition (logical zero at the $\overline{Q}$-output) latching flip-flop 54, flip-flop 60 then automatically resetting itself so that the reset input of flip-flop 54 is changed to logical one and this flip-flop is now ready for reaction to signals getting to its other inputs.

Figure 5:
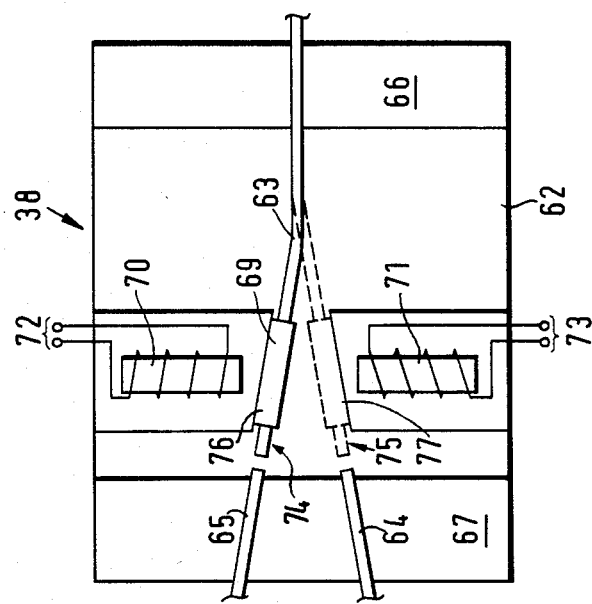
FIG. 5 is a plan view of a two-way optical switch useful in practicing the invention.

Details of an optical two-way switch 38 is shown in FIG. 5.

FIG. 5 is a diagrammatic view looking down on the base-plate 62, on which light guide ends 63, 64 and 65 are so fixed by fixing parts 66 and 67 as to be in a common plane, the end 63 of light guide extending toward the ends of light guides 64 and 65, light guide 63 extending past fixing part 66 in such manner that while being parallel to a side of the base-plate 62, it may be moved as shown in solid and dotted lines. The two light guide or fiber optic ends 64 and 65 are fixed to part 67 in spaced apart relation.

A sleeve 69 of ferromagnetic material is slipped onto moving light guide end 63, the inner diameter of the sleeve being matched to the outer diameter of the light guide so that the two parts are frictionally engaged.

Two stops 76 and 77 define limits of movement of the light guide 63 between positions 74 and 75. Light guide 63 can be moved forward and backward between these two positions. The position of stops 76 and 77 is such that the end face of the light guide 63 when in its position 74 is opposite to the end face of the light guide end 65 and in its other end position 75 is opposite to the end face of the light guide end 64, the distance between the two ends being small to ensure proper alignment. The angle of slope of stops 76 and 77 is not nearly as great as shown in FIG. 5, a slight slope being desired to keep bending movement of the light guide 63 as small as possible. Furthermore, the distance between the stops 76 and 77 has been exaggerated for purpose of illustration, the distance being in fact small for effecting rapid switching.

Light guide end 63 may be moved backwards and forwards by two electromagnets 70 and 71, respectively placed behind stops 76 and 77 and may be turned on and off by way of connections 72, 73 under control of the central control 10.

With such a two-way switch, it is possible for the end part 63 of the light guide, which only has a very small mass, to be whipped from one end position to the other, the small space between the ends of the light guides and the accurate alignment thereof minimizing loss of pulse light transmission.

Figure 6:
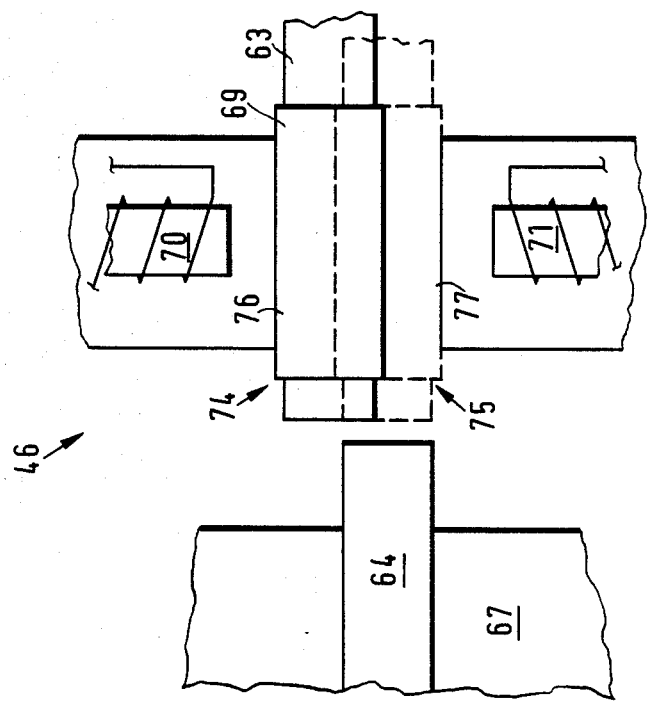
FIG. 6 is a view on an enlarged scale of part of an attenuation device which may be used in the apparatus of FIG. 1.

FIG. 6 is a view on a greater scale of part of a device, which is generally like two-way switch 38 and which, is used as the attenuation device 46, in which respect, to keep the figure simple, the base-plate 62 and the fixing part 66 of FIG. 5 have been omitted although it is to be understood they are used.

The most important respect in which the system of FIG. 6 is different to that of FIG. 5 is that, on the one hand, only a single light guide end 64 is fixed to its fixing part 67, that is to say there is no light guide end 65, while the stop 76 is positioned opposite stop 77 so that the end face of the moving light guide end 63, when in the end position denoted in full lines, will be in alignment with a part of the end face of the fixed-position light guide end 64. In the other end position 75 denoted in broken lines, the two end faces are fully aligned.

It will be appreciated from FIG. 6 that if the moving light guide end 63 is moved by operation of magnet 70 into end position 74, only a part of the light will be transferred between light guide ends 63, 64. If the stop 76 is made adjustable to different positions, different attenuation factors could be obtained since the degree of overlap of light guides 63 and 64 could thereby be controlled.

What is claimed is:

1. Distance measuring apparatus for measuring the time of travel of individual unmodulated measuring light pulses to a target and therefrom, by reflection, back to the apparatus which for this purpose comprises:

a light pulse transmitter for emitting on triggering thereof individual unmodulated light pulses of short duration, a light beam splitter means for splitting individual light pulses from said transmitter into two parts, a first of which is directed toward an optical transmitting means and a second of which is directed into a reference light path means, said optical transmitting means transmitting said first light pulse part as a measuring light pulse toward said target, an optical receiving means for receiving a reflected measuring light pulse from the target, a receiving channel comprising an electro-optical receiving means for receiving from said optical receiving means said reflected measuring light pulse and from said light beam splitter means, via said reference light path means, said second part of each light pulse as a reference light pulse and transforming each received light pulse into an electrical signal, electrical circuit means in said receiving channel for processing each electrical signal to produce time-related distance measuring signals for starting and stopping of said measurement of time of travel of each measuring light pulse, said receiving channel, on responding to each received light pulse having a recovery time which must elapse before the next light pulse can be processed, said reference light path means including intermediate its ends, connected to said light beam splitter and said electro-optical receiving means, first and second functionally parallel reference light path branches of different length and selector means for selecting one of such first and second reference light path branches for supplying the reference light pulse via the selected branch to said electro-optical receiving means, said first reference light path branch comprising a short reference light path branch to transit time through which for the reference light pulse is relatively short and said second reference light path branch comprising a long reference light path branch the transit time through which for the reference light pulse is relatively long, control means for controlling operation of said selector means as a function of target distance, the selector means being controlled to supply reference light pulses to the electro-optical receiving means from the short reference light path branch for long distance targets and for supply of reference light pulses to the electro-optical receiving means from the long reference light path branch for short distance targets, said relatively long transit time for the reference light pulse being at least equal to two times said recovery time of said receiving channel, and a time measuring means connected to the receiving channel and supplied therefrom with said time-related distance measuring signals for measuring the time of travel of each measuring light pulse.

2. A distance measuring apparatus as claimed in claim 1, wherein said control means also provides for trigger pulses for triggering said transmitter and being operative to detect whether, on supplying a reference light pulse to said electro-optical receiving means via said short reference light path branch, a given measuring light pulse and the corresponding reference light pulse arrive at the electro-optical receiving means within a time shorter than or equal to said receiving channel recovery time, and, should this occur, to reject the measurement, to automatically repeat the measuring operation by again triggering the transmitter and to effect operation of said selector means to supply the resulting reference light pulse to said electro-optical receiving means via said long reference light path branch.

3. A distance measuring apparatus as claimed in claim 1, wherein said reference light path means includes in advance of said first and second light path branches an optical delay means the transit time through which for a reference light pulse is short compared to the transit time of that reference light pulse through said long reference light path branch but sufficiently long to ensure receipt of the reference light pulse by the electro-optical receiver means free of interference signals generated on light pulse transmissions by the transmitter.

4. A distance measuring apparatus as claimed in claim 3, wherein said optical delay means, said long and short reference light path branches and said reference light path means are all constituted of light guide fibres.

5. A distance measuring apparatus as claimed in claim 4, wherein the light guide fibres for said optical delay means and for said long reference light path branch are in coil form.

6. A distance measuring apparatus as claimed in claim 4, wherein the first and second light path branches together with said reference light path, leading thereto from said light beam splitter means, form a Y-shaped divider, the bottom leg of the Y receiving each reference light pulse from said beam splitting means, one of the upper legs of the Y directing a part of each reference light pulse into one end of the long reference light path branch and the other of the upper legs of the Y directing a part of each reference light pulse into one end of the short reference light path branch.

7. A distance measuring apparatus as claimed in claim 6, wherein the opposite ends of the long and short reference light path branches converge forming with said reference light path means, leading to the electro-optical receiving means, an inverted Y shaped divider, one of the legs of which receives the reference light pulse from the long reference light path branch and the other leg of which receives the reference light pulse from the short reference light path branch, the common leg of the Y directing each reference light pulse to said electro-optical receiving means.

8. A distance measuring apparatus as claimed in claim 7, wherein said selector means comprises two optical attenuation means for attenuating the reference light pulse from substantially no attenuation to substantially total attenuation of said attenuation means, the one of said two attenuation means being arranged in the short reference light path branch and the other one of said two attenuation means being arranged in the long reference light path branch and the two attenuation means being oppositely controlled.

9. A distance measuring apparatus as claimed in claim 6, wherein said selector means comprises an optical change-over switch controlled by said control means to connect one of the long and short reference light path branches to said electro-optical receiving means.

10. A distance measuring apparatus as claimed in claim 9, wherein the selector means is positionable to pass to said electro-optical receiving means at least part of said reference light pulse in said long reference light path branch as well as at least part of said reference light pulse in said short reference light path branch for determining transit time difference of a reference light pulse through the long reference light path branch and through the short reference light path branch.

11. A distance measuring apparatus as claimed in claim 4, wherein said short reference light path branch includes attenuation means of fixed attenuation value for compensating for the attenuatiion experienced by the reference light pulses in passing through the long reference light path branch, due to the length of the light guide fibre constituting said branch.

12. A distance measuring apparatus as claimed in claim 1, wherein said reference light path means includes in advance of said first and second light path branches an optical attenuation unit which attenuates reference light pulses passing through said reference light path means to approximate the intensity of the corresponding measuring light pulse when received by the electro-optical receiving means.

13. A distance measuring apparatus as claimed in claim 9, wherein the optical change-over switch comprises three light guide fibres disposed in a common plane, two of said three fibres being fixed, the third being movable between said two fixed light guide fibres for alternate alignment with the ends thereof, the positions of the third fibre being defined by stops.

14. A distance measuring apparatus as claimed in claim 13, wherein a sleeve of ferromagnetic material is provided over the movable light guide fibre end, said optical change-over switch incorporating magnet means for moving, on reaction with the ferromagnetic sleeve, the movable light guide fibre between its aligned positions with the ends of said fixed fibres.

15. A distance measuring apparatus as claimed in claim 1, wherein said receiving channel includes a resonance means the input of which is connected to the output of said electro-optical receiving means, said resonance means producing an oscillation signal in response to each light pulse received by said electro-optical receiving means, and a first comparison circuit having a zero-transition comparator unit for producing a time-related distance measuring start or stop signal for the time measuring means at a given zero-transition of the signal of said resonance system.

16. A distance measuring apparatus as claimed in claim 15, wherein said receiving channel further comprises an amplifier connected between said resonance system and said first comparison circuit, said amplifier having an automatic voltage control circuit for maintaining its zero direct voltage output constant.

17. A distance measuring apparatus as claimed in claim 16, wherein said first comparison circuit includes a first comparator unit, producing a control signal when the output signal of the resonance system after being amplified by said amplifier, becomes greater than a first reference level, and a second comparator unit producing a control signal when the output signal of the resonance system, after being amplified by said amplifier becomes smaller than a second reference level, whereby said second reference level has a smaller absolute value than the first reference level, said first and second reference levels being different from said zero-level, said first comparison circuit further comprising a memory circuit for storing the control signal of said first comparator unit on occurrence thereof and enabling, through a logic circuit, said zero-transition comparator unit upon the occurrence of the control signal of the second comparator only if the latter control signal is produced after the control signal of the first comparison unit.

18. A distance measuring apparatus as claimed in claim 17, wherein said first and said second comparator units define a first reference level and a second reference level, respectively, being adapted for comparison with a predetermined half-oscillation of each of said oscillation signal.

19. A distance measuring apparatus as claimed in claim 18, wherein said first comparison circuit further comprises a delay unit for delaying the enabling signal for the zero-transition comparator unit so that a later zero-transition, rather than the first zero-transition occurring after production of the control signal of the second comparator unit, is used for producing a time-related distance measuring signal for starting or stopping the time measurement.

20. A distance measuring apparatus as claimed in claim 19, wherein the delay of said delay unit is such that the fourth zero-transition after exciting the oscillation signal is used for producing a time-related distance measuring signal.

21. A distance measuring apparatus as claimed in claim 20, wherein the logic circuit is formed by a normally reset D-flip-flop, whose data input receives an enabling signal produced at the same time as the control signal of the first comparator unit, and whose clocking input receives a clocking pulse produced at the same time as the control signal of the second comparator unit and whose one output produces, in the set condition of the D-flip-flop, a signal enabling the zero-level comparator unit, which signal is delayed by said delay unit.

22. A distance measuring apparatus as claimed in claim 21, wherein the D-flip-flop is reset on the first reaction of the zero-transition comparator unit.

23. A distance measuring apparatus as claimed in claim 22, wherein the zero-transition comparator unit is latched by way of a gate circuit, by the output signal delayed by the delay unit, of the D-flip-flop as well as by a signal produced in the rest condition by one of the outputs of the zero-transition comparator unit, and wherein said signal is prevented by a gate circuit from latching the zero-transition comparator unit, when the D-flip-flop is set.

24. A distance measuring apparatus as claimed in claim 17, further comprising a first latching circuit preventing said first comparator unit from producing further control signals in response to further half-oscillations of each oscillation signal after having produced a first control signal, and a second latching circuit for preventing said second comparator unit from producing further control signals in response to further half-oscillations of each oscillation signal after having produced a first control signal, the two latching circuits being disabled by a reset signal produced a short time before a light pulse arrives at the receiving channel.

25. A distance measuring apparatus as claimed in claim 17, wherein the memory circuit is only ready for receiving a control signal produced by the first comparator unit when a time slot signal is produced, the time slot signal being produced a short time before expected receipt of a light pulse by the receiving channel and being matched in time to the greatest distance to be measured whereby the comparison of the amplitude of the oscillation signal with the two reference levels is only enabled shortly before receipt of said light pulse in the receiving channel, and immediately after production of said control signals of said first and said second comparator units, said comparison is again locked.

26. A distance measuring apparatus as claimed in claim 16, further comprising an attenuation unit in the light path between the optical receiving means and the electro-optical receiving means, means for controlling the sensitivity of said electro-optical receiving means, means for controlling the output power of said transmitter, and a second comparison circuit comprising the output signal of said resonance system, after being amplified by said amplifier, with a third reference level denoting the top limit of a linear range of said amplifier, which second comparison circuit produces, if the absolute value of said amplitude is greater than said third reference level, a control signal for discarding the time of travel measurement produced, for controlling said output power of said transmitter and/or the sensitivity of said electro-optical receiving means and/or for activating said above noted attenuation unit and for initiating a new distance measurement attempt.

27. A distance measuring apparatus as claimed in claim 26, wherein said electro-optical receiving means is a photodiode, the sensitivity of the electro-optical receiving means being changed by changing the bias voltage of said diode.

28. A distance measuring apparatus as claimed in claim 26, wherein said controllable attenuation unit is connected in the light path between the optical receiving means and a photodiode of the electro-optical receiving means and comprises two light guide fibre ends, arranged in a common plane, one of said two ends being fixed while the other is movable in said plane between two positions in one of which the end face of the movable light guide fibre end is in complete alignment with end face of the fixed light guide fibre and in the other position of which the end face of the movable light guide fibre is in only partial alignment with the end face of the fixed light guide fibre whereby only part of the light is transmitted to the electro-optical receiving means.

29. A distance measuring apparatus as claimed in claim 28, wherein a sleeve of ferromagnetic material is provided on movable light guide fibre, said controllable attenuation unit further comprising a magnet arrangement for moving the movable light guide fibre between its two positions.

* * * * *